United States Patent

Betensky

[11] 3,975,089
[45] Aug. 17, 1976

[54] ZOOM LENS

[75] Inventor: Ellis I. Betensky, Toronto, Canada

[73] Assignee: Ponder & Best, Inc., Santa Monica, Calif.

[22] Filed: Apr. 19, 1974

[21] Appl. No.: 462,366

[52] U.S. Cl. .............................. 350/184; 350/176; 350/177; 350/187
[51] Int. Cl.² ......................................... G02B 15/18
[58] Field of Search .......... 350/184, 186, 176, 177, 350/222, 187

[56] References Cited
UNITED STATES PATENTS

| | | | |
|---|---|---|---|
| 3,464,763 | 9/1969 | Berger | 350/184 X |
| 3,533,678 | 10/1970 | Altman et al. | 350/184 |
| 3,850,507 | 11/1974 | Uesugi | 350/187 |

Primary Examiner—Paul A. Sacher
Attorney, Agent, or Firm—DeLio and Montgomery

[57] ABSTRACT

A lens having an equivalent focal length variable between predetermined limits where the lower limit is less than the diagonal of the image frame and where the lens comprises four lens groups of positive, negative, negative and positive powers, respectively, and the first three groups mounted from the object end are movable in unequal relationship to vary the focal length while all four groups are axially movable in fixed relation to each other to focus the lens.

19 Claims, 4 Drawing Figures

ZOOM LENS

This invention relates to lenses and more particularly relates to variable focal length or zoom lenses.

Zoom lenses conventionally comprise four major lens groups where from the object end the first group is utilized for focusing, the second and third groups are moved to vary the focal length and compensate for image position with the change and the fourth lens group is stationary.

The motions of the second and third groups are unequal with respect to each other. Therefore it is necessary to select powers of the lens groups so as to provide the necessary motions of the second and third groups within the allowable space.

In lenses of the type described, it is necessary to choose the lens powers in such a manner as to provide sufficient space to accomplish the desired zooming. Dependent on the zoom range desired, this can increase the front vertex distance (FVD) of the lens. A significantly improved zoom lens which is much more compact could be provided if the moving lens groups could pass through or intersect each other. This, of course, cannot be accomplished physically.

However, in the present invention the same effect is achieved with a virtual image for the second group derived by moving the first lens to provide a virtual object in the appropriate location. The present invention provides a more compact zoom lens having a lower section of its focal length range less than the image frame diagonal by imparting predetermined motion to the front element during zooming of the second and third groups.

The movement of the first group during zooming further enhances the lens design by providing a greater opportunity to introduce the proper compensating changes in aberration to correct the zoom lens over the entire range. This is particularly true in zoom lenses that will zoom to a wide angle EFL. Here as the field angles increase with decreasing EFL, the change of astigmatism and variations of coma become significantly greater. Conventional two-moving lens group zoom lenses operating in the wide angle equivalent focal length range do not provide the opportunity to entirely correct and compensate for these aberrations.

Accordingly, the present invention provides a new and improved zoom lens where the shortest EFL is such that the lens may be termed a wide angle lens. Otherwise stated, a lens embodying the invention will have its shortest EFL a smaller dimension than the diagonal of the image frame, and in some focal lengths the lens becomes retrofocus.

Briefly stated, the invention in one form thereof comprises a four-lens group zoom lens where the first lens group from the object side is of positive power. The second and third lens groups are of negative power and the fourth lens group is of positive power. The lens groups are arranged so that all four groups move in fixed relation during focusing, and the first, second and third groups move in predetermined unequal relation with respect to each other during zooming. The second and third groups have a particular range of lens radii parameters in order to simultaneously correct for astigmatism, coma and distortion as the first group moves to vary the focal length, which parameters are hereinafter described.

An object of this invention is to provide a new and improved compact zoom lens.

Another object of this invention is to provide a compact zoom lens having fifteen percent of its focal length range in the wide angle range and extending into the telephoto range.

Another object of this invention is to provide a lens of the type described having a large relative aperture.

The features of the invention which are believed to be novel are particularly pointed out and distinctly claimed in the concluding portion of this specification. However, the invention together with further objects and advantages thereof may best be appreciated by reference to the following detailed description taken in conjunction with the drawing, wherein:

Figure 1:
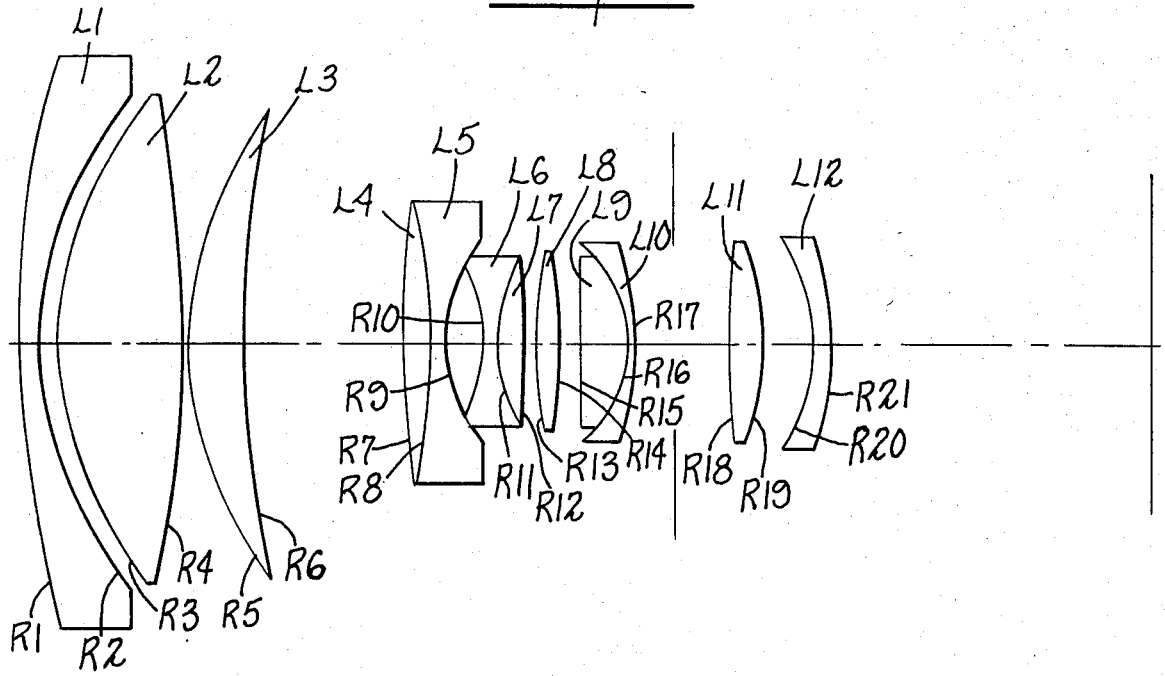
FIG. 1 is a diagrammatic view of a lens embodying the invention.

A lens embodying the invention comprises a twelve-element lens L1–L12 arranged in four groups. The surface radii of each element is denoted by R1–R21 as shown in FIG. 1. The groups comprise the elements as shown below:

| GROUP I | - | Elements L1, L2, L3 |
| GROUP II | - | Elements L4 and L5 |
| GROUP III | - | Elements L6 and L7 |
| GROUP IV | - | Elements L8 – L12. |

Group I is of converging or positive power. Group II is of negative or diverging power. Group III is of negative or diverging power and Group IV is of positive or converging power.

Element L1 is a meniscus with a concave side toward the image plane. Element L2 is bi-convex. Element L3 is convex-concave. Element L4 is bi-convex and cemented to element L5 which is bi-concave. Elements L6 and L7 comprise a cemented doublet with L6 being bi-concave and element L7 bi-convex. Element L8 is bi-convex. Element L9 is bi-convex and cemented to the concave surface of meniscus L9. Element L11 is bi-convex and element L12 is a meniscus with the convex side facing the image plane.

The lens of FIG. 1 as scaled to a 36-83mm focal length for a 36×24mm image frame and a relative aperture of f/2.8 may be further defined by the data of Table I below:

TABLE I

| Lens | | Surface Radius (mm) | Axial Distance Between Surfaces (mm) | $N_d$ | $V_d$ |
|---|---|---|---|---|---|
| L1 | R1 | 135.72 | | | |
| | | | 2.60 | 1.805 | 25.5 |
| | R2 | 46.71 | | | |
| | | | 2.84 | | |
| L2 | R3 | 46.50 | | | |
| | | | 13.80 | 1.531 | 62.1 |
| | R4 | −152.15 | | | |
| | | | 0.100 | | |
| L3 | R5 | 41.84 | | | |
| | | | 6.60 | 1.694 | 53.3 |
| | R6 | 125.20 | | | |

TABLE I-continued

| Lens | | Surface Radius (mm) | Axial Distance Between Surfaces (mm) | $N_d$ | $V_d$ |
|---|---|---|---|---|---|
| | R7 | 140.19 | (1) | | |
| L4 | | | 3.10 | 1.847 | 23.8 |
| | R8 | − 60.45 | | | |
| L5 | | | 1.10 | 1.834 | 37.3 |
| | R9 | 17.98 | | | |
| | | | (2) | | |
| | R10 | − 16.56 | | | |
| L6 | | | 1.00 | 1.498 | 65.1 |
| | R11 | 22.97 | | | |
| L7 | | | 3.10 | 1.785 | 25.7 |
| | R12 | −112.11 | | | |
| | | | (3) | | |
| | R13 | 53.32 | | | |
| L8 | | | 2.90 | 1.620 | 60.3 |
| | R14 | − 42.06 | | | |
| | | | 2.00 | | |
| | R15 | −502.33 | | | |
| L9 | | | 5.00 | 1.487 | 70.4 |
| | R16 | − 14.89 | | | |
| L10 | | | 0.90 | 1.805 | 25.5 |
| | R17 | − 45.59 | | | |
| | | | 11.53 | | |
| | R18 | 125.96 | | | |
| L11 | | | 3.50 | 1.639 | 45.1 |
| | R19 | − 25.90 | | | |
| | | | 5.98 | | |
| | R20 | − 19.40 | | | |
| L12 | | | 1.296 | 1.805 | 25.5 |
| | R21 | − 35.59 | | | |

(1) .47 − 19.48
(2) 15.94 − 5.01
(3) 9.33 − 1.19

Where $N_d$ is the index of refraction, $V_d$ is the Abbe number, L1-L12 are lens elements from the object end, and R1-R21 are the radii of lens surfaces, and the distances between radii are measured on the axis of the lens.

During a zooming mode of operation from the longer equivalent focal length EFL to the shorter EFL, Groups II and III will move towards the object at unequal rates and Group I will initially move toward the object and then back toward the image. Plots of movement of lens Groups I, II and III during a zooming mode of operation are set forth in FIG. 2 in which the abscissa is equivalent focal length and the ordinant is in millimeters as measured from the axial point on the object side of the surface of lens L8. All movements are taken with respect to the axial center point of lens surface R13. The particular lens disclosed has an equivalent focal length range of 36–83mm and a relative aperture of f/2.8.

A lens embodying the invention with a positive front or first group may have a lower limit equivalent focal length of about 0.8 to 0.9 of the diagonal of the image frame. In the foregoing example the diagonal of the 24 × 36 mm image frame is 43.27 mm. The upper limit focal length is not critical but for practical purposes will be about three times or less than the lower limit.

Figure 3:
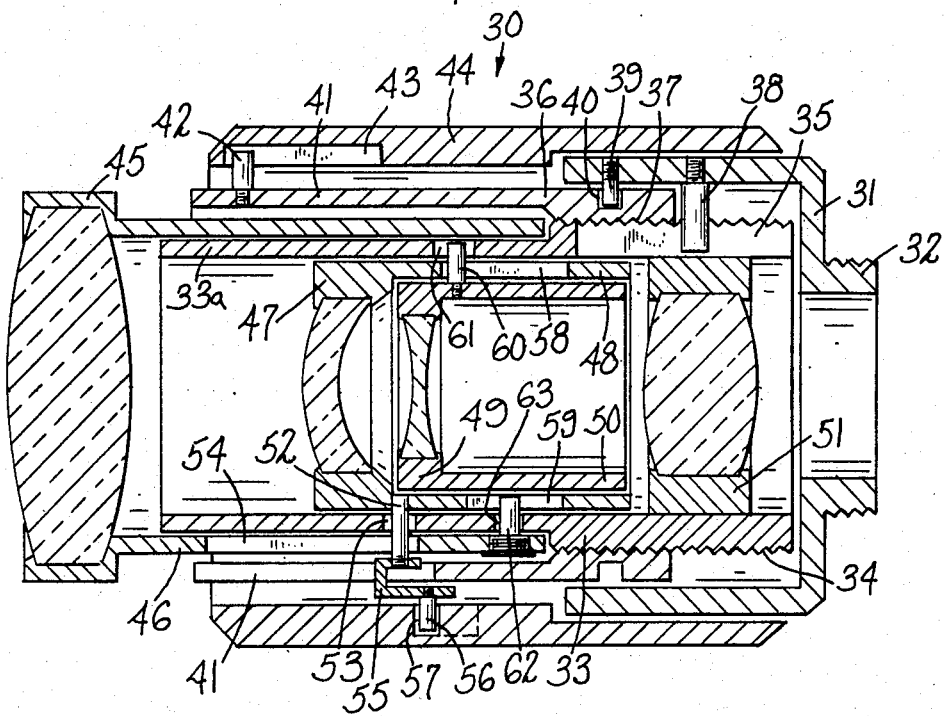
FIG. 3 is a side elevation in half section of a lens housing structure in which the lens may be mounted.
Figure 4:
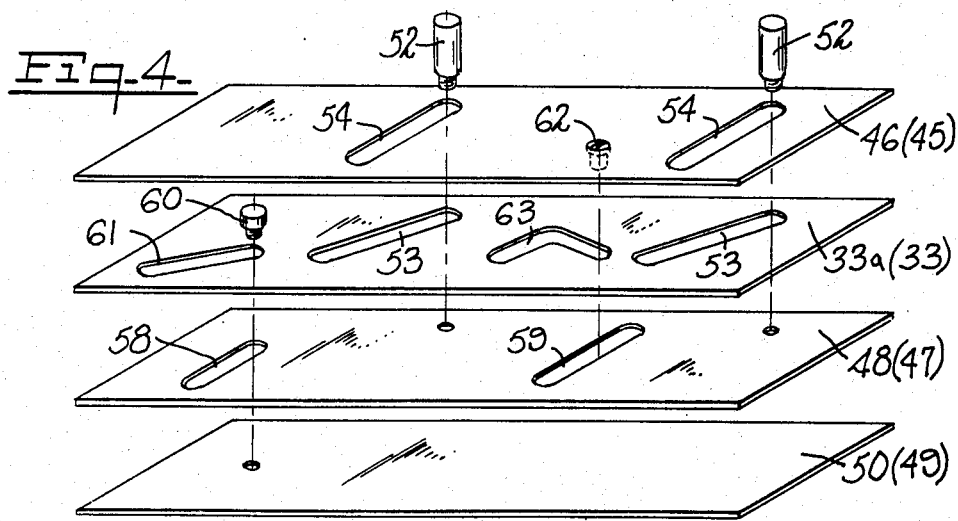
FIG. 4 is a plane developed view of annular members of the structure of FIG. 3 set forth to facilitate explanation of the movements.

The movement of Groups I, II and III may be accomplished through a lens 30 as shown in FIG. 3. Reference is also made to FIG. 4 to enhance explanation of the lens movements. The lens 30 comprises a primary body member 31, having a camera mounting portion 32, shown as being of the screw type. A tubular lens mounting member 33 extends at least partially into body member 32, and has an externally threaded rear portion 34, and an axially directed slot 35 therein. A focusing member 36 has internal threads 37 engaging threads 34. A pin 38 carried in body member 31 extends into lens mounting slot. Thus when focusing member 36 is rotated, it imparts only linear movement to lens mounting member 33. A pin 39 is carried in body member 31 and extends into an annular slot 40 defined in focusing member 36. Focusing member 36 has one or more axially extending arms 41, which may be defined on a portion of a spiral for reasons hereinafter made apparent. At least one arm 41 carries a pin 42 therein which extends into an axial slot 43 in a focus and zoom operating member 44.

A Group I lens mount 45 includes a tubular portion 46 telescopically extending over lens mounting member 33. A Group II lens mount 47 includes a tubular portion 48 within lens mounting member 33. A Group III mount 49 includes a tubular portion 50 within tubular portion 48. In FIG. 3 the lens groups I, II, III and IV are shown as single elements for simplicity of illustration. Group IV is set in a mount 51 fixed in lens mounting member 33. The tubular or sleeve-like portions 46 and 50 are close fitting but easily slidable with respect to tube portion 33a of mounting 33. Portion 50 is close fitting but slides easily in portion 48.

Reference is now made to FIG. 4 in conjunction with FIG. 3. FIG. 4 shows tubular members 33a, 46, 48 and 50 developed into planar members. Tube 33a has a plurality of cam slots therein which define the movements of mounts 45, 47 and 49. Pins 52 from mount 47 extend through cam slots 53 and tube 33a, and axial slots 54 in tube 46, to a ring member 55 (FIG. 3). Pins 56 extend from ring member 55 to slots 57 in control member 44. The slots 57 are defined on a pitch equivalent to the pitch of threads 34 and 37 for reasons hereinafter made apparent.

As thus far described, as control member 44 is moved axially along the lens, pins 52 will move in cam slots 53, and mount 47 will move both axially and rotatably along tube 33a.

Figure 2:
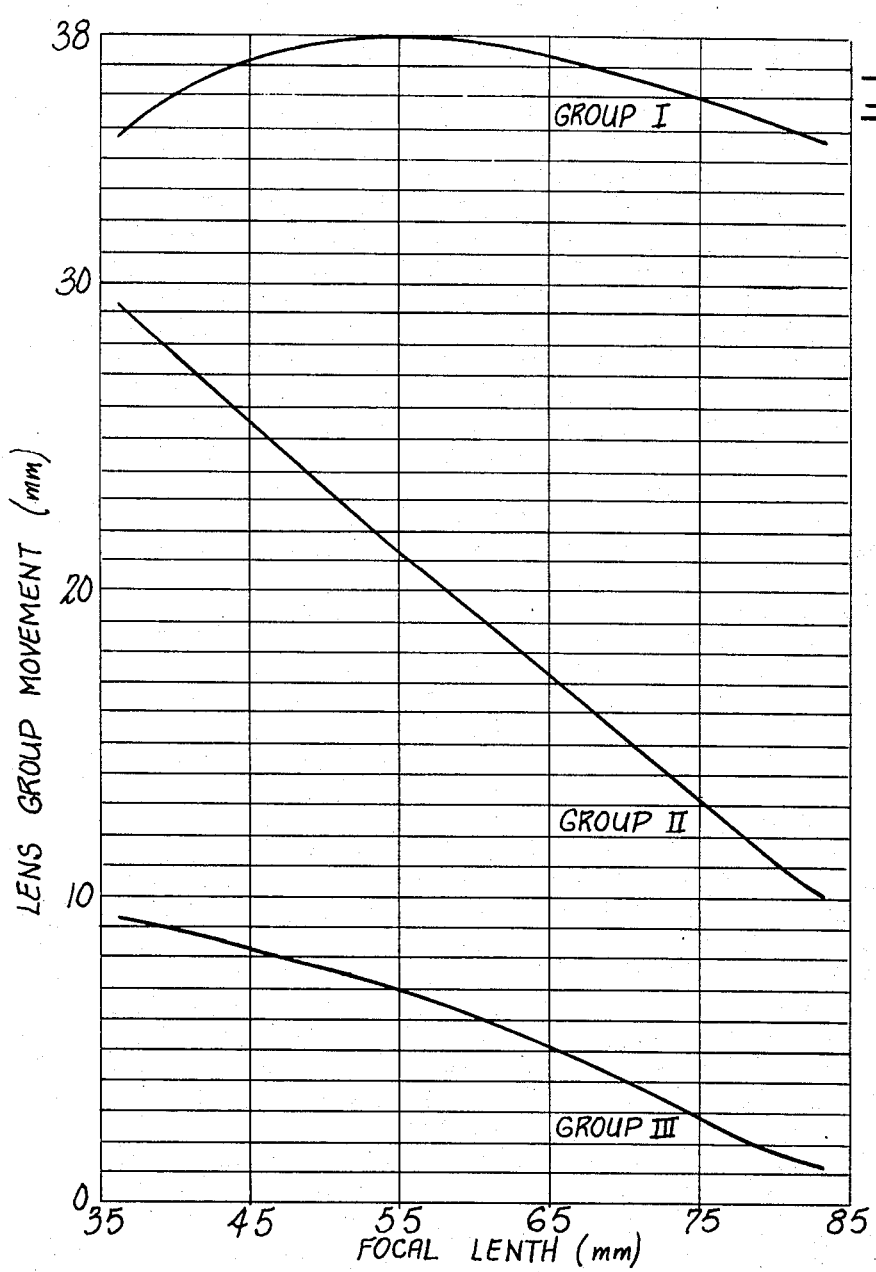
FIG. 2 is a plot of the movements of the zooming lens groups with respect to focal length.

Tube 48 has axial slots 58 and 59 defined therein. A pin 60 carried by mount 49 extends through slot 58 into a cam slot 61 in tube 33a. A pin 62 extends into slot 59 through a cam slot 63 in tube 33a. The edges defining the slots 58 and 59, upon rotative motion of mount 47 imparts rotative motion to tubes 50 and 46, respectively, through pins 62 and 60, respectively. The rotative motion imparted to pins 60 and 62 causes them and their respective lens mounts to follow the cam slots 61 and 63, respectively, and predetermine the relative motions of lens Group I, II, and III, as shown in FIG. 2.

For focusing, control member 44 is rotated. This produces rotation of focusing member 36, and linear movement of lens mounting member 33 with all lens groups in fixed relation to one another. The linear motion of mounting member 33 corresponds with the pitch of slots 57 and no zooming effect is imparted to the lens groups. The operator may zoom and focus simultaneously with the control member 44.

The lens mechanical means for producing the desired motions is set forth in more detail in the copending application of Masatoshi Shimojima Ser. No. 462,300 filed on the same day as this application, now U.S. Pat. No. 3,915,557.

The movement of Group I during zooming permits a more compact lens design by decreasing the otherwise required movements of Groups II and III. Otherwise stated, the movement of Group I optically increases the effective range of movement of Groups II and III without increasing the physical dimensional movement. The movement of Group I during zooming further permits optical corrections otherwise not available in two moving group zoom lenses.

Table II exemplifies the extent of movement of lens groups I, II and III when moved to vary the focal length of the lens from 83mm to 36mm as the groups move toward or away from the object between the upper and lower equivalent focal length limits.

TABLE II

| Group I | 3.24mm (decreasing EFL) |
| --- | --- |
| | 3.15mm (increasing EFL) |
| Group II | 19.07mm |
| Group III | 8.14mm |

The foregoing table exemplifies the relatively short travel, particularly of group II, to vary the equivalent focal length of the lens. Only a small degree of movement of the first positive group is required to substantially reduce the travel of group II and provide a very compact lens for the range of equivalent focal lengths. This, in turn, enables the powers of the lens groups to be reduced with resulting benefit in optical properties. The powers of the lens groups are given in Table III.

TABLE III

| Group I | - | .0157 |
| --- | --- | --- |
| Group II | - | −.0395 |
| Group III | - | −.0098 |
| Group IV | - | .0333 |
| Groups I, II, III | | −.0301 |
| Groups I, II, III, IV | | .0277 |

The last two powers given are at an equivalent focal length of 36mm.

The front vertex distance of the lens is 133.7mm at the lower end of the focal length range and 135.7mm at the higher end of the focal length range.

The lens thus may vary from a wide angle focal length where it is a retrofocus lens to a 2.3 focal length zooming ratio and has a front vertex distance of only 1.63 times the maximum focal length.

The back focal length of the lens is 40.06mm. This is greater than the equivalent focal length through over 8 percent of the focal length range.

To exemplify the advantages desired from a lens embodying the invention, a lens of the same overall dimension was computed having the same first order properties, but with only groups II and III movable for zooming. The powers of the lens groups were

TABLE IV

| Group I | .0159 |
| --- | --- |
| Group II | −.0388 |
| Group III | −.0178 |
| Group IV | .0371 |

The second and third lens groups of the above-identified lens had essentially the same motion as the corresponding groups of the lens groups of Tables I and III. However, the power of group III increased over 80 percent. It is apparent that if the powers were held the same, the movement of lens groups II and III would have to be greater and the front vertex distance increased to permit such movement.

In the design of wide angle lens, (where the EFL of the lens is less than the diagonal of the image frame) the limiting aberration is higher order field curvature. This aberration measured laterally changes from 0.088 in the lens of Tables I and II to 0.1 for the two moving group lens of Table IV.

In order to maintain the lateral aberration acceptably small for an intended film application, a third order field curvature must be introduced. It is well known to those skilled in the art that the increased third order field curvature, known as Petzval sum, will result in poor performance due to the out-of-focus condition for off-axis field points. Additionally, aberrations are largely dependent upon lens powers. For example, the third order spherical aberration varies as the cube of the power. Since it is necessary to correct the third order aberrations introduced by one lens element with cancelling aberrations introduced by other elements the importance of maintaining minimum lens powers is apparent.

To achieve the compact wide angle to telephoto zoom lens in accordance with the invention which utilizes three moving elements to reduce the front vertex distance certain relationships of elements are desired.

More specifically, the following relationship should be achieved for the facing surfaces R9 and R10 of the second and third lens groups.

$$|0.35| \quad R/EFL_s < |0.6|$$

Where R is the radius of surfaces R9 or R10 and $EFL_s$ is the shortest equivalent focal length of the lens.

Additionally, it is preferred that the following relationship be maintained.

$$50.0 < R_o < 67.0$$

where $$1/R_o = |1/R_1| + |1/R_2|$$

where $R_1$ is the radius of the object side surface of the second lens group, corresponding to R7 of FIG. 1 and Table I, and $R_2$ is the radius of the image side of the third group, corresponding to $R_{12}$ of FIG. 1 and Table I.

A further desired parameter of the disclosed lens for the focal length range mentioned is that $$0.8 < R_o/FL_m < 1.25$$

where $FL_m$ is the geometrical mean of the extremes of the focal length range, that is the square root of the product of the extreme focal lengths.

Where a lens is designed in accordance with these parameters, the FVD is kept to a minimum yielding a compact wide-angle to telephoto zoom lens, and aberrations are reduced to an extent heretofore unachieved in a wide angle to telephoto zoom lens.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A lens having an equivalent focal length variable between predetermined limits, comprising from the object end a first positive group, a second negative group, a third negative group, and a fourth positive group, said first, second and third groups being simultaneously axially movable at different rates with respect to said fourth group to vary the focal length of said lens, all of said lens groups being movable in axially fixed relation to each other to vary the focus of said lens, said lens having a back focal length greater than the equivalent focal length of said lens over a portion of its variable focal length range.

2. The lens of claim 1 wherein the radii on which the facing surfaces of said second and third groups are defined are substantially one-half of the lower limit equivalent focal length of said lens, and said surfaces are concave.

3. The lens of claim 1 wherein said second lens group has an object side surface defined by the radius $R_1$ and said third lens group has an image side surface defined by the radius $R_2$, and $$1/|R_1| + 1/|R_2| = 1/R_a$$

where $$50.0 < R_a < 67.0.$$

4. The lens of claim 3 wherein $$0.8 < R_a/FL_m < 1.25$$

where $FL_m$ is the geometric mean of the upper and lower focal length limits.

5. The lens of claim 1 wherein the lower limit focal length of said lens is between 0.8 and 0.9 of the diagonal of the image frame for said lens.

6. The lens of claim 1 wherein the upper limit focal length of said lens is three times or less than the lower limit focal length.

7. The lens of claim 1 defined by substantially the following data:

| Lens | | Surface Radius (mm) | Axial Distance Between Surfaces (mm) | $N_d$ | $V_d$ |
|---|---|---|---|---|---|
| L1 | R1 | 135.72 | 2.60 | 1.805 | 25.5 |
|    | R2 | 46.71 | 2.84 | | |
| L2 | R3 | 46.50 | 13.80 | 1.531 | 62.1 |
|    | R4 | −152.15 | 0.100 | | |
| L3 | R5 | 41.84 | 6.60 | 1.694 | 53.3 |
|    | R6 | 125.20 | (1) | | |
| L4 | R7 | 140.19 | 3.10 | 1.847 | 23.8 |
|    | R8 | −60.45 | 1.10 | 1.834 | 37.3 |
| L5 | R9 | 17.98 | (2) | | |
| L6 | R10 | −16.56 | 1.00 | 1.498 | 65.1 |
|    | R11 | 22.97 | 3.10 | 1.785 | 25.7 |
| L7 | R12 | −112.11 | (3) | | |
| L8 | R13 | 53.32 | 2.90 | 1.620 | 60.3 |
|    | R14 | −42.06 | 2.00 | | |
| L9 | R15 | −502.33 | 5.00 | 1.487 | 70.4 |
|    | R16 | −14.89 | 0.90 | 1.805 | 25.5 |
| L10 | R17 | −45.59 | 11.53 | | |
| L11 | R18 | 125.96 | 3.50 | 1.639 | 45.1 |
|    | R19 | −25.90 | 5.98 | | |
| L12 | R20 | −19.40 | 1.296 | 1.805 | 25.5 |
|    | R21 | −35.59 | | | |

(1) .47 – 19.48
(2) 15.94 – 5.01
(3) 9.33 – 1.19

Where L1—L12 are lens elements from the object end to the image end, R1—R21 are the radii of lens elements L1—L12, $N_d$ is the index of refraction and $V_d$ is the Abbe number.

8. A lens substantially as defined below having a variable equivalent focal length:

| Lens | | Surface Radius (mm) | Axial Distance Between Surfaces (mm) | $N_d$ | $V_d$ |
|---|---|---|---|---|---|
| L1 | R1 | 135.72 | 2.60 | 1.805 | 25.5 |
|    | R2 | 46.71 | 2.84 | | |
| L2 | R3 | 46.50 | 13.80 | 1.531 | 62.1 |
|    | R4 | −152.15 | 0.100 | | |
| L3 | R5 | 41.84 | 6.60 | 1.694 | 53.3 |
|    | R6 | 125.20 | (1) | | |
| L4 | R7 | 140.19 | 3.10 | 1.847 | 23.8 |
|    | R8 | −60.45 | 1.10 | 1.834 | 37.3 |
| L5 | R9 | 17.98 | (2) | | |
| L6 | R10 | −16.56 | 1.00 | 1.498 | 65.1 |
|    | R11 | 22.97 | 3.10 | 1.785 | 25.7 |
| L7 | R12 | −112.11 | (3) | | |
| L8 | R13 | 53.32 | 2.90 | 1.620 | 60.3 |
|    | R14 | −42.06 | 2.00 | | |
| L9 | R15 | −502.33 | 5.00 | 1.487 | 70.4 |
|    | R16 | −14.89 | 0.90 | 1.805 | 25.5 |
| L10 | R17 | −45.59 | 11.53 | | |
| L11 | R18 | 125.96 | 3.50 | 1.639 | 45.1 |
|    | R19 | −25.90 | 5.98 | | |
| L12 | R20 | −19.40 | 1.296 | 1.805 | 25.5 |
|    | R21 | −35.95 | | | |

(1) .47 – 19.48
(2) 15.94 – 5.01
(3) 9.33 – 1.19

Where L1–L12 are lens elements from the object end to the image end, R1–R21 are the radii of lens elements L1-L12, $N_d$ is the index of refraction and $V_d$ is the Abbe number.

9. A lens having an equivalent focal length variable between predetermined limits, comprising from the object end a first positive group, a second negative group, a third negative group, and a fourth positive group, said first, second and third groups being simultaneously axially movable at different rates with respect to said fourth group to vary the focal length of said lens, all of said lens groups being movable in axially fixed relation to each other to vary the focus of said lens, the lower limit focal length of said lens being 0.8 to 0.9 of the diagonal of the image frame for said lens.

10. The lens of claim 9 wherein the radii on which the facing surfaces of said second and third groups are defined are substantially one-half of the lower limit equivalent focal length of said lens, and said surfaces are concave.

11. The lens of claim 9 wherein said second lens group has an object side surface defined by the radius $R_1$ and said third lens group has an image side surface defined by the radius $R_2$, and $$1/|R_1| + 1/|R_2| = 1/R_o$$

where $$50.0 < R_o < 67.0.$$

12. The lens of claim 11 wherein $$0.8 < R_o/FL_m < 1.25$$

where $FL_m$ is the geometric mean of the upper and lower focal length limits.

13. A lens having an equivalent focal length variable between predetermined limits, comprising from the object end a first positive group, a second negative group, a third negative group, and a fourth positive group, said first, second and third groups being simultaneously axially movable at different rates with respect to said fourth group to vary the focal length of said lens, all of said lens groups being movable in axially fixed relation to each other to vary the focus of said lens, the lower limit focal length of said lens being 0.8 to 0.9 of the diagonal of the film plane for said lens and the higher limit focal length being less than 3.0 times the lower limit focal length.

14. The lens of claim 13 wherein the radii on which the facing surfaces of said second and third groups are defined are substantially one-half of the lower limit equivalent focal length of said lens, and said surfaces are concave.

15. The lens of claim 13 wherein said second lens group has an object side surface defined by the radius $R_1$ and said third lens group has an image side surface defined by the radius $R_2$, and $$1/|R_1| + 1/|R_2| = 1/R_o$$

where $$50.0 < R_o < 67.0.$$

16. The lens of claim 15 wherein $$0.8 < R_o/FL_m < 1.25$$

where $FL_m$ is the geometric mean of the upper and lower focal length limits.

17. The lens of claim 13 defined by substantially the following data:

| Lens | | Surface Radius (mm) | Axial Distance Between Surfaces (mm) | $N_d$ | $V_d$ |
|---|---|---|---|---|---|
| L1 | R1 | 135.72 | 2.60 | 1.805 | 25.5 |
|    | R2 | 46.71 | 2.84 | | |
| L2 | R3 | 46.50 | 13.80 | 1.531 | 62.1 |
|    | R4 | −152.15 | 0.100 | | |
| L3 | R5 | 41.84 | 6.60 | 1.694 | 53.3 |
|    | R6 | 125.20 | (1) | | |
| L4 | R7 | 140.19 | 3.10 | 1.847 | 23.8 |
|    | R8 | −60.45 | 1.10 | 1.834 | 37.3 |
| L5 | R9 | 17.98 | (2) | | |
| L6 | R10 | −16.56 | 1.00 | 1.498 | 65.1 |
|    | R11 | 22.97 | | | |
| L7 | R12 | −112.11 | 3.10 | 1.785 | 25.7 |
|    |    |    | (3) | | |
| L8 | R13 | 53.32 | 2.90 | 1.620 | 60.3 |
|    | R14 | −42.06 | 2.00 | | |
| L9 | R15 | −502.33 | 5.00 | 1.487 | 70.4 |
|    | R16 | −14.89 | | | |
| L10 | R17 | −45.59 | 0.90 | 1.805 | 25.5 |
|    | R18 | 125.96 | 11.53 | | |
| L11 | R19 | −25.90 | 3.50 | 1.639 | 45.1 |
|    | R20 | −19.40 | 5.93 | | |
| L12 | R21 | −35.59 | 1.296 | 1.805 | 25.5 |

(1) .47 – 19.48
(2) 15.94 – 5.01
(3) 9.33 – 1.19

Where L1–L12 are lens elements from the object end to the image end, R1–R21 are the radii of lens elements L1–L12, $N_d$ is the index of refraction and $V_d$ is the Abbe number.

18. A lens having an equivalent focal length variable between predetermined limits, comprising from the object end a first positive group, a second negative group, a third negative group, and a fourth positive group, said first, second and third groups being simultaneously axially movable at different rates with respect to said fourth group to vary the focal length of said lens, all of said lens groups being movable in axially fixed relation to each other to vary the focus of said lens, said lens having a back focal length greater than the equivalent focal length of said lens over a portion of its variable focal length range, said second and third groups having facing concave surfaces.

19. The lens of claim 18 wherein said second lens group has an object side surface defined by the radius $R_1$ and said third lens group has an image side surface defined by the radius $R_2$, and $$1/R_1 + 1/R_2 = 1/R_o$$

where $$50.0 < R_o < 67.0$$

and $$0.8 < R_o/FL_m < 1.25$$

where $FL_m$ is the geometric mean of the upper and lower focal length limits.

* * * * *

UNITED STATES PATENT AND TRADEMARK OFFICE
CERTIFICATE OF CORRECTION

PATENT NO. : 3,975,089
DATED : August 17, 1976
INVENTOR(S) : Ellis I. Betensky

It is certified that error appears in the above–identified patent and that said Letters Patent are hereby corrected as shown below:

Column 6, line 25, the mathematical expression should read as follows:

$$-|.35| \leqq R/EFL_S < |.6|$$

Column 9, line 1 of claim 17, "claim 13" should read --claim 9--.

Column 10, line 30, under the heading "Axial Distance Between Surfaces (mm)", "5.93" should read --5.98--.

Signed and Sealed this

Twenty-fifth Day of January 1977

[SEAL]

Attest:

RUTH C. MASON
*Attesting Officer*

C. MARSHALL DANN
*Commissioner of Patents and Trademarks*